US012367508B2

(12) United States Patent
Gershon et al.

(10) Patent No.: US 12,367,508 B2
(45) Date of Patent: Jul. 22, 2025

(54) ANOMALY DETECTION FOR SERVICES PRICING

(71) Applicant: EMC IP Holding Company LLC, Hopkinton, MA (US)

(72) Inventors: Noga Gershon, Beer Sheva (IL); Amihai Savir, Sansana (IL); Marcel Korner, Chorvatsky Grob (SK); Vanya Boranova, Spring, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 381 days.

(21) Appl. No.: 17/384,531

(22) Filed: Jul. 23, 2021

(65) Prior Publication Data

US 2023/0032388 A1 Feb. 2, 2023

(51) Int. Cl.

| | |
|---|---|
| ***G06Q 30/02*** | (2023.01) |
| ***G06F 18/23213*** | (2023.01) |
| ***G06N 20/00*** | (2019.01) |
| ***G06Q 30/0201*** | (2023.01) |
| ***H04L 41/5009*** | (2022.01) |

(52) U.S. Cl.

CPC ... *G06Q 30/0206* (2013.01); *G06F 18/23213* (2023.01); *G06N 20/00* (2019.01); *H04L 41/5009* (2013.01)

(58) Field of Classification Search

CPC ................ G06Q 30/0206; G06N 20/00; G06F 18/23213; H04L 41/5009

See application file for complete search history.

(56) References Cited

U.S. PATENT DOCUMENTS

| | | | | |
|---|---|---|---|---|
| 2008/0059512 A1* | 3/2008 | Roitblat | .................. | G06F 16/35 707/999.102 |
| 2017/0243268 A1* | 8/2017 | Fukuda | .............. | G06Q 30/0611 |
| 2020/0380571 A1* | 12/2020 | Ramakrishnan | ..... | G06Q 20/201 |
| 2021/0056597 A1* | 2/2021 | Rached | ............. | G06Q 30/0278 |

(Continued)

OTHER PUBLICATIONS

Azika Amelia, K-Means Clustering: From A to Z, Sep. 27, 2018, <https://towardsdatascience.com/k-means-clustering-from-a-to-z-f6242a314e9a> (Year: 2018).*

(Continued)

*Primary Examiner* — Alan Torrico-Lopez

(74) *Attorney, Agent, or Firm* — Amin, Turocy & Watson, LLP

(57) ABSTRACT

A system can identify a group of computer services that correspond to respective computer hardware. The system can extract features that respectively identify characteristics of the computer services, a feature of the features comprising ratio information representative of a ratio of a first price of a computer service of the group of computer services to a second price of a corresponding computer hardware of the respective computer hardware that corresponds to the computer service. The system can convert the features into a numerical representation. The system can cluster the computer services into multiple clusters based on the numerical representation of the features. The system can identify, from a cluster of the multiple clusters and based on a machine learning model, an anomalous price for at least one computer service of the group of computer services that belongs to the cluster. The system can store an indication of the anomalous price.

20 Claims, 11 Drawing Sheets

(56) References Cited

U.S. PATENT DOCUMENTS

| | | | | |
|---|---|---|---|---|
| 2021/0241299 | A1* | 8/2021 | Ramini | G06N 5/025 |
| 2022/0214948 | A1* | 7/2022 | Yeddu | G06F 11/3476 |
| 2022/0351110 | A1* | 11/2022 | Yasuda | G06Q 10/06315 |
| 2022/0414770 | A1* | 12/2022 | Learner | G06Q 50/08 |

OTHER PUBLICATIONS

Dhiraj K, Anomaly Detection Using Isolation Forest in Python, Mar. 2, 2020, <https://blog.paperspace.com/anomaly-detection-isolation-forest/> (Year: 2020).*

* cited by examiner

400

402

404a

404b

| SKU 406 | CHASSIS 408 | PROCESSOR 410 | MEMORY 412 | RAID 414 | ... | HARD DRIVE 416 | INTERNAL OPTICAL DRIVE 418 |
|---|---|---|---|---|---|---|---|
| SKU 1 | 3.5" | SILVER | 2666MT/S UDIMMS | C1 | | 1TB 7.2K RPM SATA | DVD +/-RW, SATA |
| ... | | | | | | | |
| SKU 100 | 8" | BRONZE | 3200MT/S RDIMMS | C2 | | 600GB 15K RPM SAS | DVD ROM, SATA |

EXTRACT FEATURES THAT IDENTIFY CHARACTERISTICS OF EACH COMPUTER SERVICE OF A GROUP OF COMPUTER SERVICES, EACH COMPUTER SERVICE CORRESPONDING TO CORRESPONDING TO COMPUTER HARDWARE, A FEATURE OF THE FEATURES COMPRISING A RATIO OF A FIRST COST OF A COMPUTER SERVICE OF THE GROUP OF COMPUTER SERVICES TO A SECOND COST OF A CORRESPONDING COMPUTER HARDWARE OF THE COMPUTER HARDWARE 1004

CLUSTER COMPUTER SERVICES OF THE GROUP OF COMPUTER SERVICES INTO MULTIPLE CLUSTERS BASED ON THE EXTRACTED FEATURES, RESULTING IN CLUSTERED COMPUTER SERVICES 1006

IDENTIFY, FROM A CLUSTER OF THE MULTIPLE CLUSTERS, AN ANOMALOUS PRICE FOR AT LEAST ONE COMPUTER SERVICE OF THE CLUSTERED COMPUTER SERVICES THAT BELONGS TO THE CLUSTER 1008

(1010)

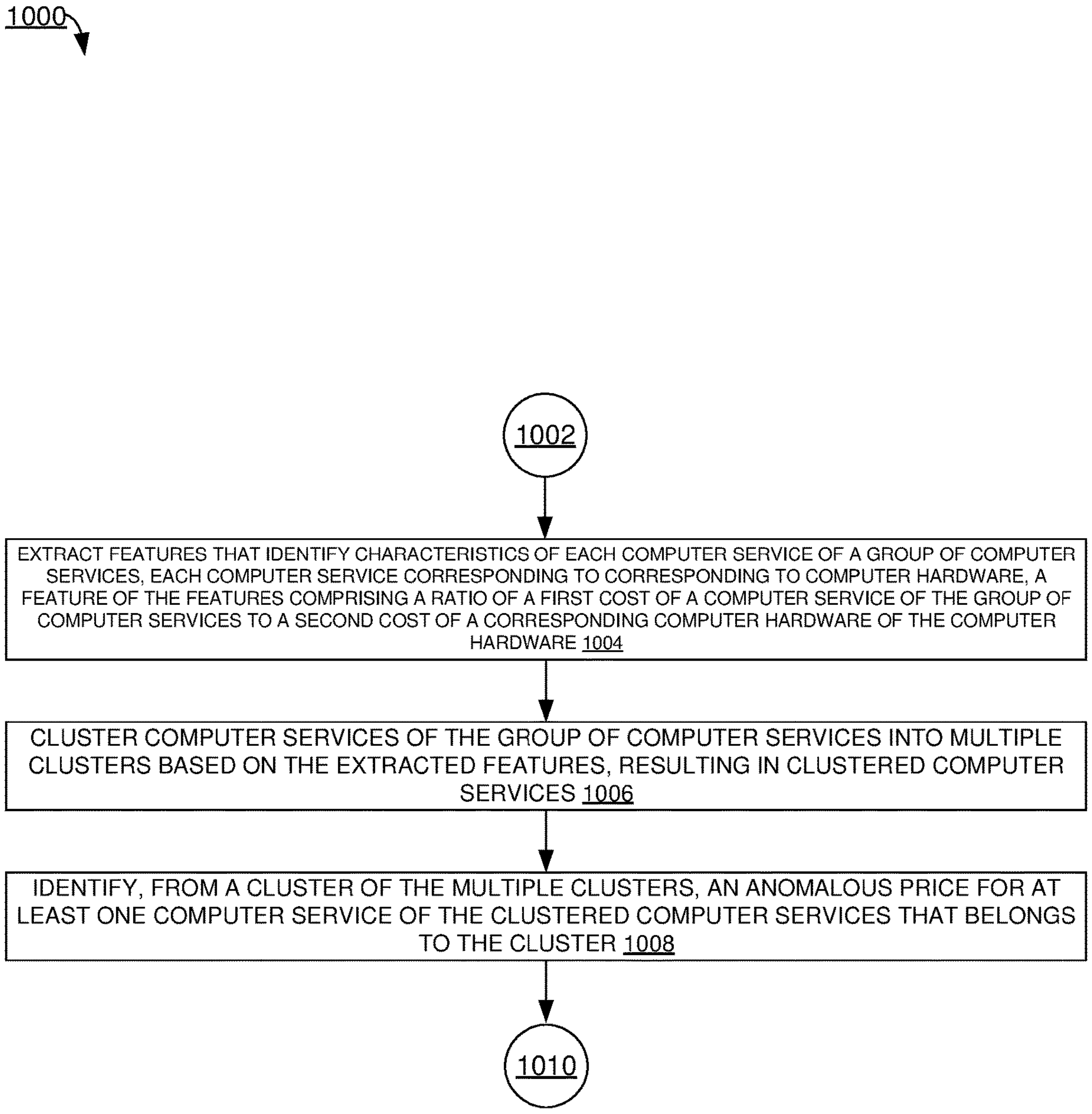

FIG. 10

ANOMALY DETECTION FOR SERVICES PRICING

BACKGROUND

Computer services (sometimes referred to as services) can comprise ongoing commitments or functionality provided for corresponding computer hardware. For example, a service can comprise a commitment to ensure that corresponding hardware is functional for a length of time. A service can include a service level, which can indicate a speed at which a problem will be resolved.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can identify a group of computer services, the computer services of the group corresponding to respective computer hardware. The system can extract features that respectively identify characteristics of the computer services, a feature of the features comprising ratio information representative of a ratio of a first price of a computer service of the group of computer services to a second price of a corresponding computer hardware of the respective computer hardware that corresponds to the computer service. The system can convert the features into a numerical representation of the features. The system can cluster the computer services into multiple clusters based on the numerical representation of the features. The system can identify, from a cluster of the multiple clusters and based on a machine learning model, an anomalous price for at least one computer service of the group of computer services that belongs to the cluster. The system can store an indication of the anomalous price.

An example method can comprise identifying, by a system comprising a processor, computer services corresponding to respective computer hardware. The method can further comprise extracting, by the system, features that identify characteristics of the computer services, a feature of the features comprising a ratio of a first price of a computer service of the computer services to a second price of a corresponding computer hardware of the respective computer hardware. The method can further comprise clustering, by the system, a group of the computer services into multiple clusters based on the features. The method can further comprise identifying, by the system and from a cluster of the multiple clusters, an anomalous price for at least one of the group of computer services that belongs to the cluster.

An example non-transitory computer-readable medium can comprise instructions that, in response to execution, cause a system comprising a processor to perform operations. These operations can comprise extracting features that identify characteristics of each computer service of a group of computer services, each computer service corresponding to corresponding to computer hardware, a feature of the features comprising a ratio of a first price of a computer service of the group of computer services to a second price of a corresponding computer hardware of the computer hardware. The operations can further comprise clustering computer services of the group of computer services into multiple clusters based on the extracted features, resulting in clustered computer services. The method can further comprise identifying, from a cluster of the multiple clusters, an anomalous price for at least one computer service of the clustered computer services that belongs to the cluster.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates example extracted features for a service that can facilitate anomaly detection for services pricing, in accordance with an embodiment of this disclosure;

FIG. 10 illustrates an example process flow for performing anomaly detection for services pricing, in accordance with an embodiment of this disclosure;

DETAILED DESCRIPTION

Overview

Figure 1:
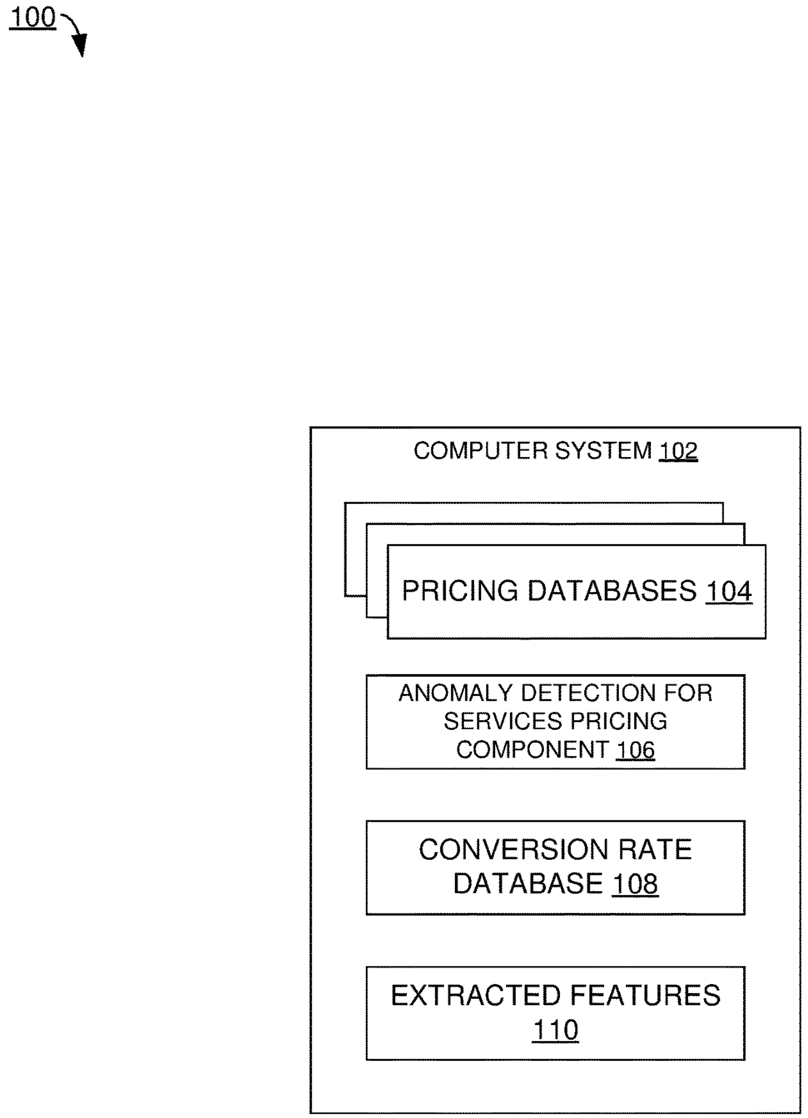
FIG. 1 illustrates an example system architecture that can facilitate anomaly detection for services pricing, in accordance with an embodiment of this disclosure.

Accuracy in pricing offered services can be crucial to ensure competitiveness, customer satisfaction, and trust with customers. The following techniques can be implemented to reduce operational costs and improve accuracy in setting prices for services. Machine learning techniques can be implemented to determine whether a price change to an existing service, or a price for a newly offered service is anomalous or not. Connections and similarities between different services, and their corresponding service level and hardware, can be identified One service provider can offer many services (which can be identified by part numbers, sometimes referred to as stock keeping units (SKUs)), which are managed across multiple systems. It can be difficult to maintain this portfolio of offered services. The present techniques can be implemented to automate a process of list price and cost auditing of offered services. Implementing these techniques can lead to improved data quality (by reducing human error), automating price maintenance processes, reducing price maintenance costs, minimizing a loss of revenue, improving a sales trust and reducing price and cost escalations, improving deal velocity, improving customer experience, and increasing productivity.

The present techniques can be implemented to overcome issues with prior techniques, which are incapable of being utilized to proactively and efficiently scanning through many (e.g., millions) of services price points across multiple countries and pricing catalogs, and to identify errors or price discrepancies between hardware product and services pricing.

Some prior techniques for identifying incorrect price points are highly manual. In some examples according to prior techniques, those pricing errors that are discovered generally are discovered by escalation from sales teams, who are quoting and comparing various quotes to present to customers. Once escalated, it can take a business day for a pricing manager to review the situation, and a longer period of time if not all relevant information is provided with the escalation request. If a pricing manager determines a price to be incorrect, the manager can then send pricing guidance to a pricing operations team. Depending on the significance of any changes and the availability of the pricing operations team, it can then take 1-5 days to get a corrected price available in live systems.

In examples where a margin (e.g., a profit margin) is too low, and according to prior techniques, pricing and costing teams generally review to confirm whether each of price and cost are correct. Where a correction is to be made, then a pricing operations team or a services cost management operations team can manually correct the prices.

In examples where a price is missing or a dummy price is stated, and according to prior techniques, pricing guidance can be provided and loaded in relevant tools.

Lack of addressing pricing issues can cause a loss of trust between sales and pricing teams, as well as lead to lost revenue due to incorrect pricing or loss of customers due to uncompetitive pricing and a longer sales cycle.

A large number of services SKUs can make manually identifying errors infeasible. Just one SKU can have multiple price points across multiple countries and/or systems families.

Additionally, prior approaches can have difficulty analyzing pricing information for new hardware products (sometimes referred to as "products"). With new products, it can be difficult to determine whether a price point is anomalous because of a lack of historical data to compare the price point against. This can generally be referred to as a "cold start" problem. The present techniques can leverage information about similar products to anchor the new pricing information, and can mitigate against a cold start problem. For example, the present techniques can be implemented to analyze similarities between product specifications, and identify anomalies in pricing a new SKU based on similar products and their services' pricing.

The present techniques can leverage statistical methods and machine learning approaches to automatically detect anomalous price points of services SKUs. A machine learning model can train periodically (e.g., on a weekly basis) and can be used to determine whether a certain price point is anomalous for a new SKU and/or a pre-existing SKU for which a price change has been detected. The machine learning model can take as input a representation of a SKU, and output a decision indicating whether the price point is anomalous.

An example approach according to the present techniques can generally implement the following steps. Historical data points can be determined and provided to a feature engineering engine. A feature engineering engine can determine vector representations of SKUs from this input information, which can be provided to a machine learning model for training, and for identifying anomalies.

Historical data points can comprise information such as, for a given price, a SKU name, a brand description, a family name, a region, a business unit, a business unit, a service level, a cost, a price, a vector representing the SKU, and/or a vector representing the service level.

The feature engineering engine can compare vector representations of SKUs and corresponding service levels to identify similarities between SKUs. Similarity information can be utilized to determine additional engineered features that can be used to identify anomalous price points.

When a new SKU is created, or a price point is changed for an existing SKU, this new data point can be included in engineered features that are inserted into a machine learning model.

An anomaly score can be determined for a SKU, and a SKU that has a score beyond a predetermined threshold value can be identified as having an anomalous price. For example, an isolation forest technique (which can comprise an unsupervised machine learning technique for identifying anomalies within a set of data by isolating anomalous data points) can be implemented to produce an anomaly score, and an anomaly score below 0.5 can indicate that a corresponding SKU has an anomalous price.

A SKU can be represented with a vector that captures technical specifications. These technical specifications can be converted into a numerical representation (e.g., categorical features can be converted with one hot encoding) and can be used to capture similarities between different products and their complexity. In an example, to capture similarities, data can be clustered using a cosine similarity approach, and each service SKU can be assigned a cluster number according to a product cluster that the service SKU serves. Similar techniques can be implemented to capture similarities between service levels.

These techniques can assist in engineering features based on similar products with similar services. Additionally, a cluster assignment can give an indication to a machine learning model regarding which data points are related, and which data points are not related.

Additional engineered features can include a current price-cost/cost ratio, a previous price-cost/cost ratio, an average of price-cost/cost for assigned clusters, and a standard deviation of price-cost/cost for assigned clusters.

As stated, the present techniques can be applied to identify anomalies in service SKU pricing. Pricing services can be complex, and machine learning techniques can be applied to determine whether a service price is anomalous.

Anomaly detection can be applied to services for complex related products. Similarities between product specifications can be analyzed, as well as specific instance specifications (e.g., leveraging install base information for a given customer). This approach can be used to enrich data, and facilitate identifying a price as an anomaly even if the price is for a new configuration, based on similar configurations in other products, or in the same product but a similar configuration (rather than a random configuration).

The present techniques can be implemented to engineer features in ways not previously done. Service types and product specifications can be converted into numerical vectors that can be used to determine similarity between two services or products.

Clustering can generally comprise an unsupervised learning task of dividing a set of data points into multiple groups in such a way that data points assigned to the same group are more similar to other data points in that group than to data points in other groups. Different clustering techniques can be utilized, such as k-means, a Gaussian Mixture Model, and Hierarchical clustering.

For example, using a k-means approach, k-means can work iteratively to cluster given data points to a closest centroid. A center of each centroid can be randomly initialized. Throughout the iterations, the centroids can be updated as data points are shifted between clusters during convergence of the k-means approach.

A number of clusters to be used can be determined according to various approaches. In some examples, a data-driven approach can be implemented in order to choose a number of clusters. An evaluation metric can be referred to as adjusted inertia, where:

$$\text{Adjusted inertia} = \frac{\text{Inertia }(K)}{\text{Inertia }(K=1)} + \alpha K$$

where K represents a number of clusters, Inertia( ) represents a sum of squared distance of samples to their closest cluster center, and a represents a manually-tuned factor that gives a penalty to a number of clusters.

A number of clusters can be selected where that number of clusters leads to a lowest adjusted inertia value.

Cosine similarity can comprise a measure of similarity between two feature vectors, defined as a cosine of an angle between the two vectors. Two vectors with a same orientation can have a cosine similarity of 1. Two vectors oriented at 90° relative to each other can have a cosine similarity of 0. Two vectors diametrically opposed can have a cosine similarity of −1. These values can hold independent of a magnitude of the respective vectors.

In some examples, a cosine similarity value can be used in positive space, and range from [0, 1]. A cosine similarity for two vectors, A and B, can be determined as follows:

$$\text{similarity} = \frac{\sum_{i=1}^{n} A_i B_i}{\sqrt{\sum_{i=1}^{n} A_i^2}\sqrt{\sum_{i=1}^{n} B_i^2}}$$

Isolation forest can comprise a machine leaning, multi-dimensional anomaly detection approach. An isolation forest approach can use a random forest to isolate observations. A number of splits involved in isolating a sample can correspond to a length of a path from a root node to a terminating node. An isolation forest approach can "isolate" observations by selecting features and selecting a split value between a minimum value and a maximum value of a selected feature. Since this partitioning can be represented by a tree structure, a number of splits involved in isolating a sample can be equivalent to a length of a path between a root node and a terminating node. A partitioning can involve a shorter path for anomalous points. An isolation forest approach can output a score between 0 and 1, with a lower score for a given data point indicating that the given data point is more anomalous.

Example Architectures

FIG. 1 illustrates an example system architecture 100 that can facilitate anomaly detection for services pricing, in accordance with an embodiment of this disclosure. System architecture 100 comprises computer system 102. In turn, computer system 102 comprises pricing databases 104, anomaly detection for services pricing component 106, conversion rate database 108, and extracted features 110.

Figure 11:
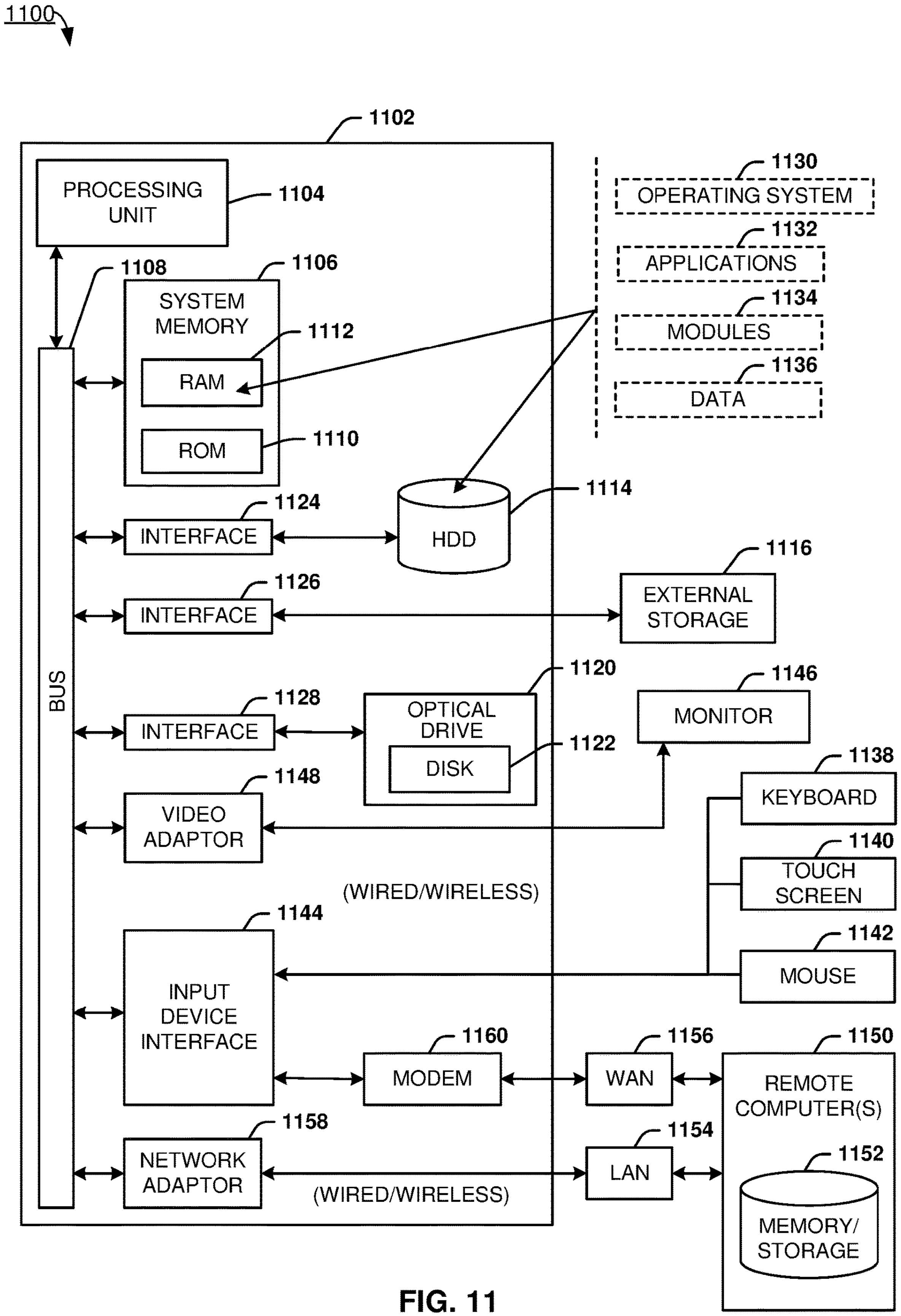
FIG. 11 illustrates an example block diagram of a computer operable to execute an embodiment of this disclosure.

In some examples, computer system 102 can be implemented with one or more instances of computer 1102 of FIG. 11.

Anomaly detection for services pricing component 106 can comprise a component that analyzes services pricing to identify pricing anomalies. In the course of performing this function, anomaly detection for services pricing component 106 can utilize pricing databases 104, conversion rate database 108, and extracted features 110.

Pricing databases 104 can comprise one or more computer databases that store information on services pricing. In some examples, pricing databases 104 can be stored across multiple computers of computer system 102. There can be multiple pricing databases (e.g., a different pricing database for each country), and multiple types of pricing databases. For example, one pricing database can indicate a service level for a SKU, while another database can identify a hierarchy of SKUs. Another pricing database can comprise a SKU repository, which can be a database that indicates whether a given SKU is active or inactive, and whether a given SKU is supposed to exist in a particular region.

Conversion rate database 108 can comprise a computer database that stores information about a currency exchange rate used in setting pricing for a given service in a given currency, which can include a date at which the service price was set. In some examples, a service price can have been set using a then-prevailing exchange rate between two currencies, which is no longer the current exchange rate.

Figure 5:
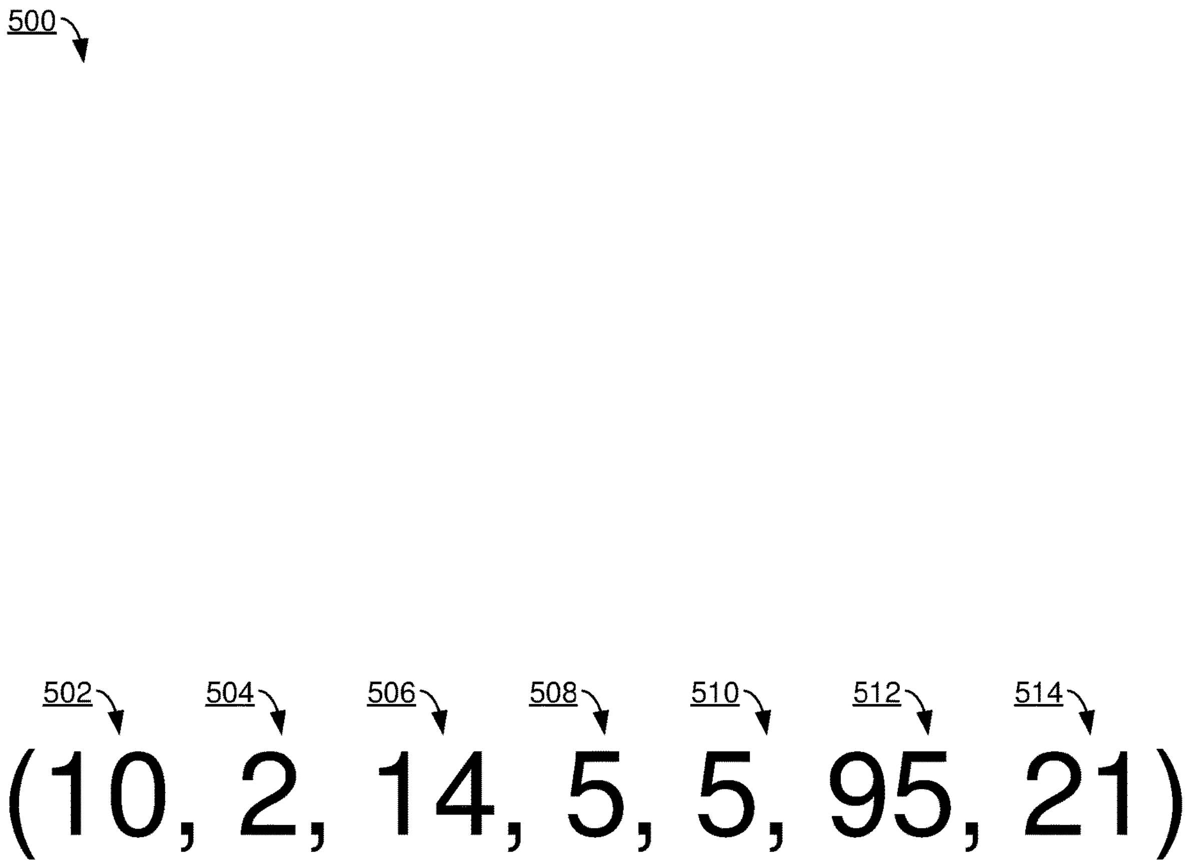
FIG. 5 illustrates a feature vector that can facilitate anomaly detection for services pricing, in accordance with an embodiment of this disclosure.

Extracted features 110 can comprise information about services that is determined, and can be similar to extracted features 400 of FIG. 4, or feature vector 500 of FIG. 5. Regarding extracted features 110, prices can be based on features offered, a corresponding hardware product, and a country in which the service is offered. Products can have hierarchies, e.g., one product can be considered to be a premium version of another product. Similarly, service levels can have hierarchies, e.g., a mission-critical service level for a particular product can be a higher grade of service than a non-critical service level for that product. In some examples, prices can be expressed as a price rate—a ratio of a price of the service to a price of the corresponding hardware.

Figure 6:
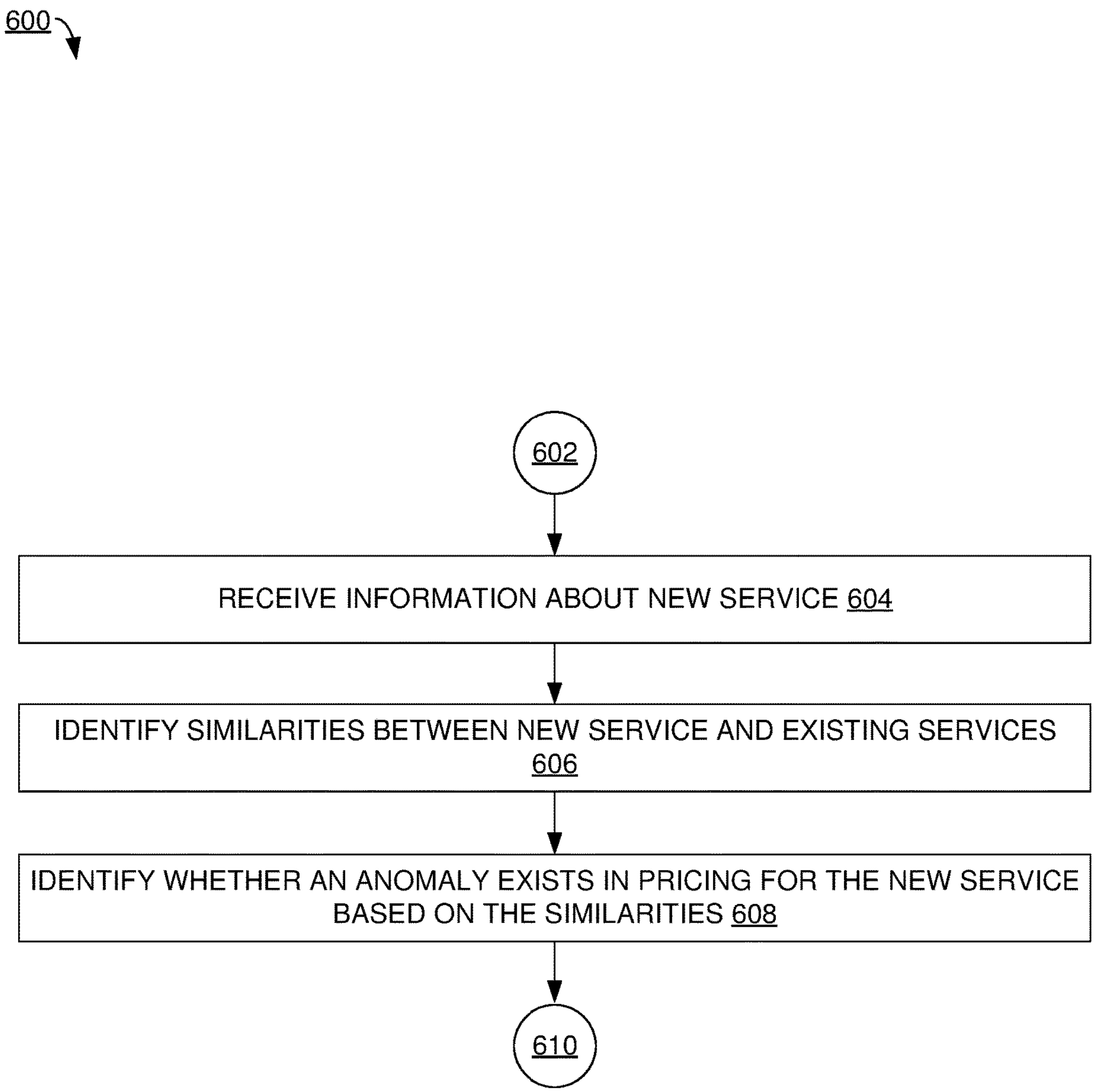
FIG. 6 illustrates an example process flow for analyzing a new service that can facilitate anomaly detection for services pricing, in accordance with an embodiment of this disclosure.
Figure 7:
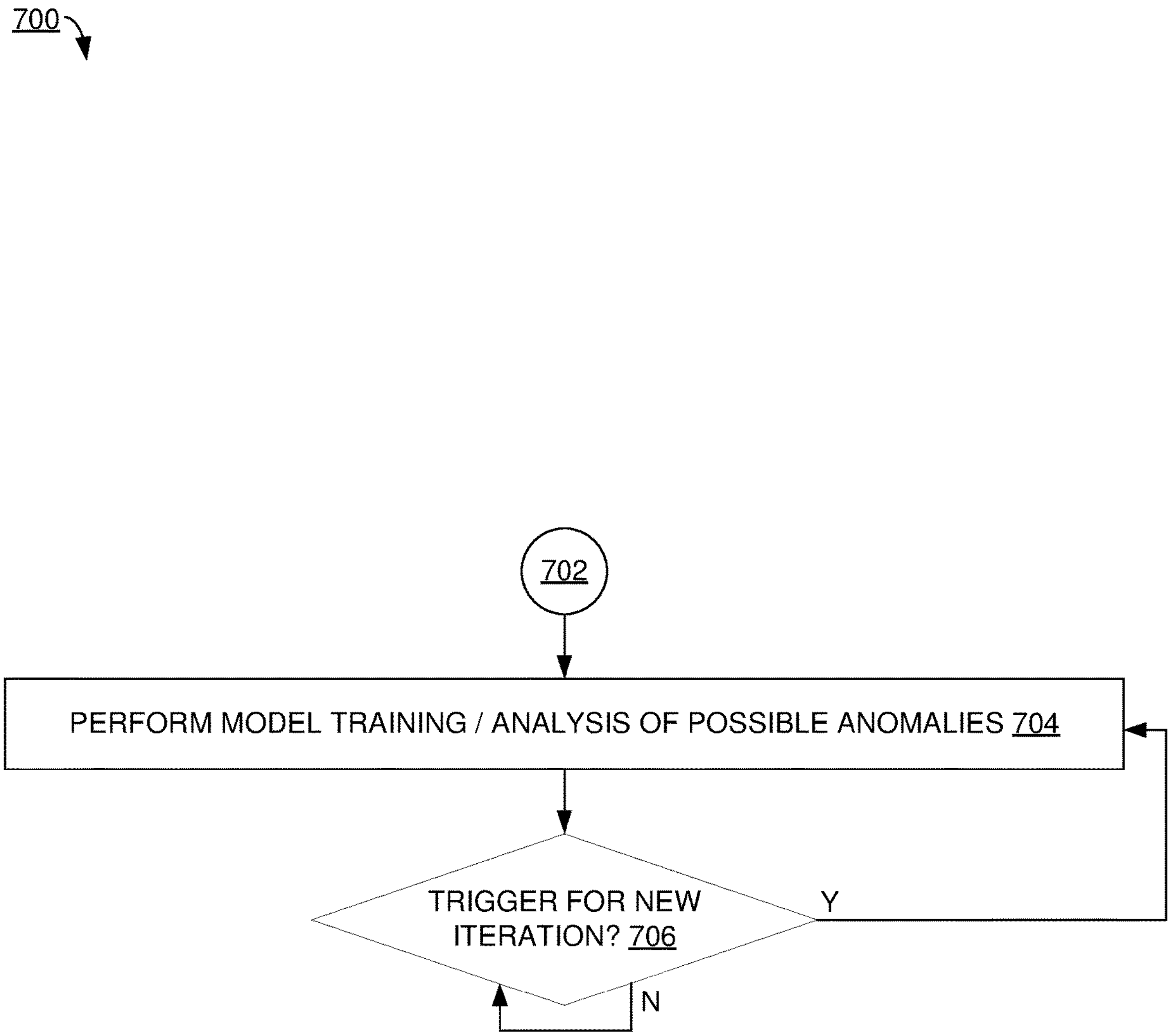
FIG. 7 illustrates an example process flow for performing iterations that can facilitate anomaly detection for services pricing, in accordance with an embodiment of this disclosure.
Figure 8:
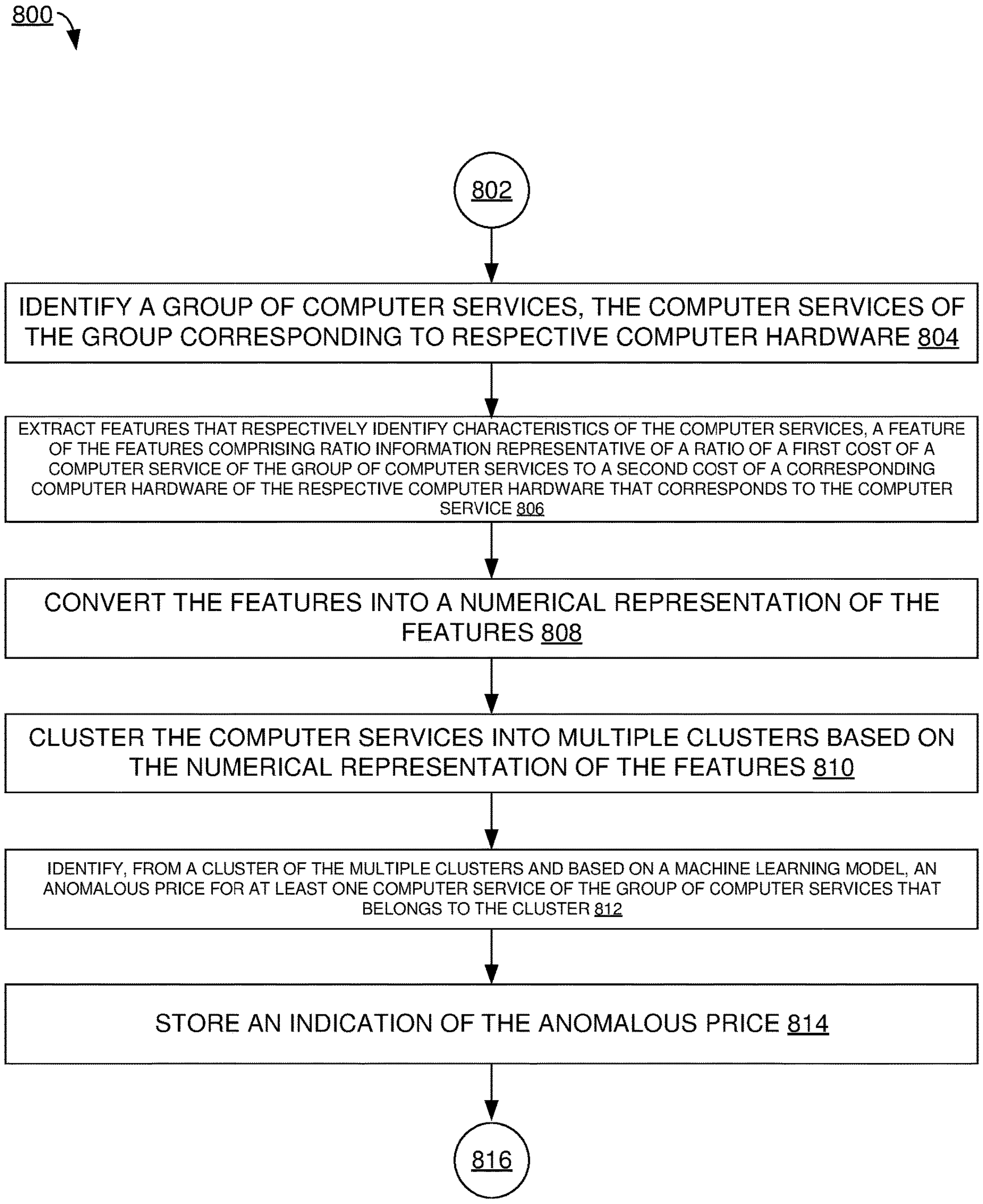
FIG. 8 illustrates an example process flow for performing anomaly detection for services pricing, in accordance with an embodiment of this disclosure.
Figure 9:
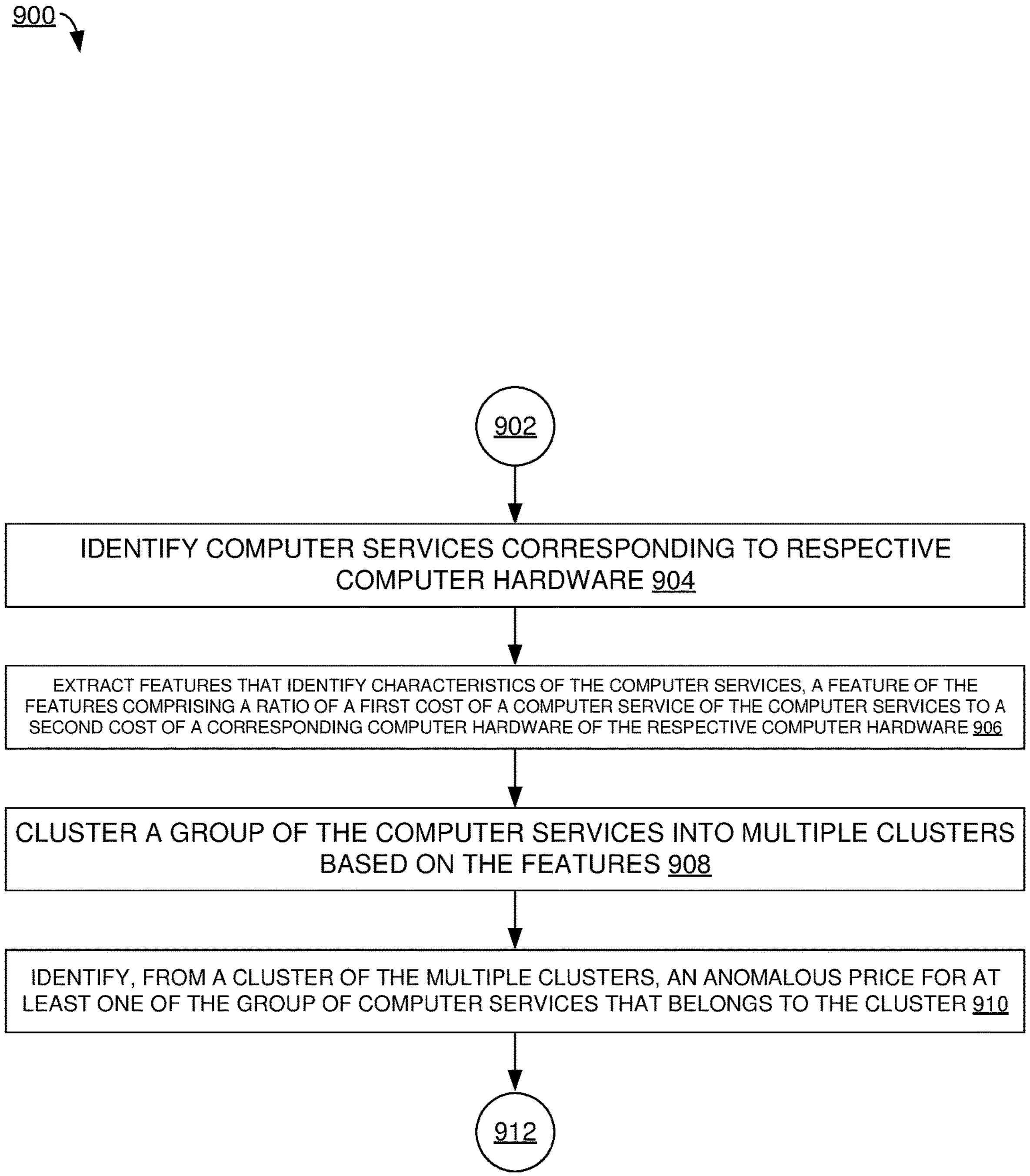
FIG. 9 illustrates an example process flow for performing anomaly detection for services pricing, in accordance with an embodiment of this disclosure.

In the course of implementing anomaly detection for services pricing, anomaly detection for services pricing component 106 can implement part(s) of process flow 600 of FIG. 6, process flow 700 of FIG. 7, process flow 800 of FIG. 8, process flow 900 of FIG. 9, and/or process flow 1000 of FIG. 10.

Figure 2:
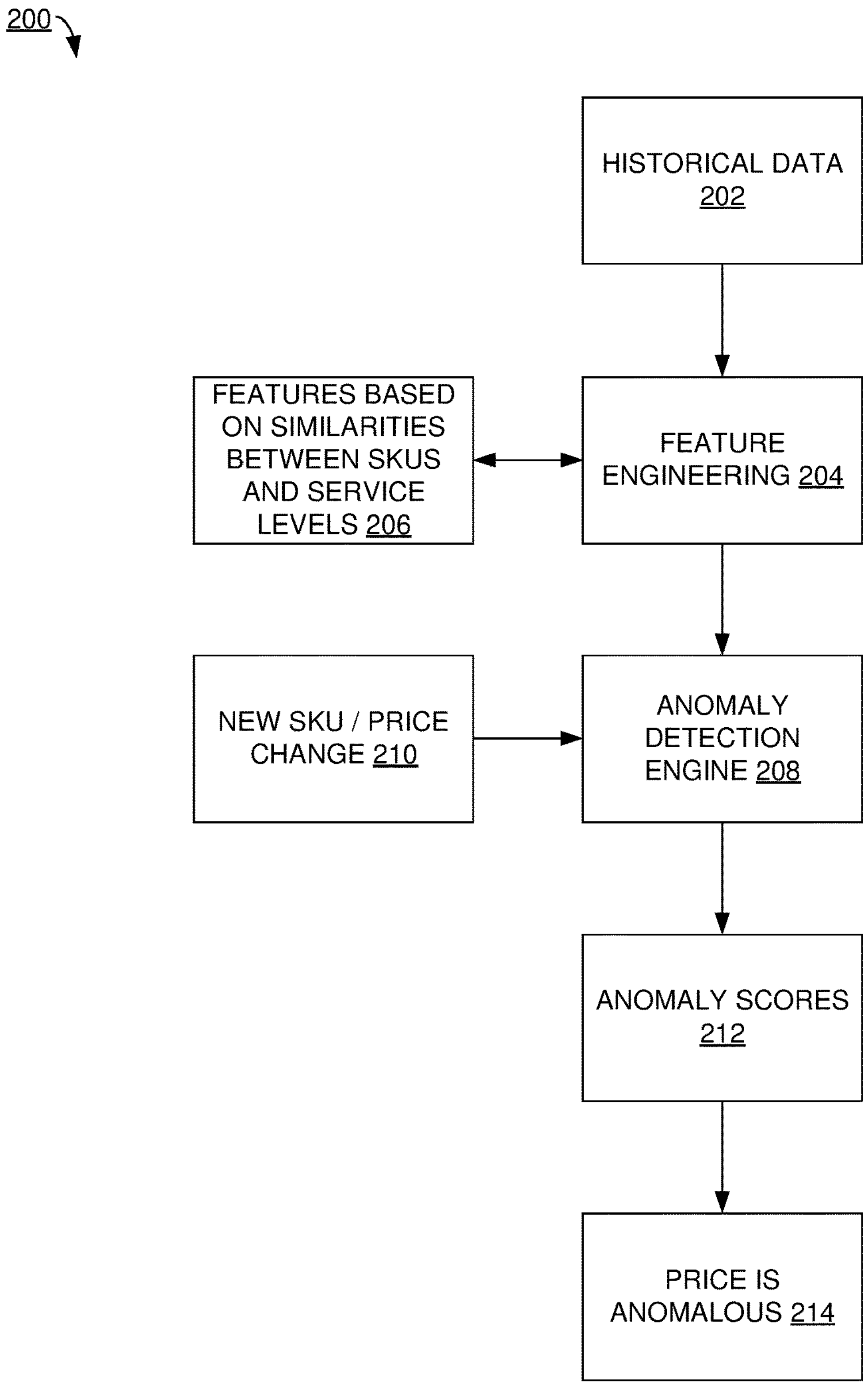
FIG. 2 illustrates another example system architecture that can facilitate anomaly detection for services pricing, in accordance with an embodiment of this disclosure.

FIG. 2 illustrates another example system architecture 200 that can facilitate anomaly detection for services pricing, in accordance with an embodiment of this disclosure. In some examples, system architecture 300 can be utilized to implement anomaly detection for services pricing component 106 of FIG. 1. System architecture 200 comprises historical data 202, feature engineering 204, features based on similarities between SKUs and service levels 206, anomaly detection engine 208, new SKU/price change 210, anomaly scores 212, and price is anomalous 214.

Historical data 202 can comprise information on existing services pricing, such as that stored in pricing databases 104 of FIG. 1. Feature engineering 204 can comprise a computer component that extracts features from historical data 202. Feature engineering 204 can also cluster similar SKUs together, and from those clustered similar SKUs derive further engineered features, such as those of features based on similarities between SKUs and service levels 206.

Feature engineering 204 can provide information on extracted features to anomaly detection engine 208 (such as in the form of feature vectors), and anomaly detection engine 208 can use this extracted feature information to train a machine learning model to identify anomalous pricing for services.

New SKU/price change 210 (representing either a new service, or a pre-existing service for which a price has changed) can be input to anomaly detection engine 208, which can process new SKU/price change 210 to determine whether it has an anomalous price. An output of anomaly detection engine can be anomaly scores 212 that correspond to new SKU/price change 210. Anomaly scores 212 can be used to determine price is anomalous 214. For example, isolation forest techniques can be used that output a value that ranges on [0, 1]. Where the values of anomaly scores 212 is less than or equal to 0.5 that can indicate that the price is anomalous in determine price is anomalous 214.

Figure 3:
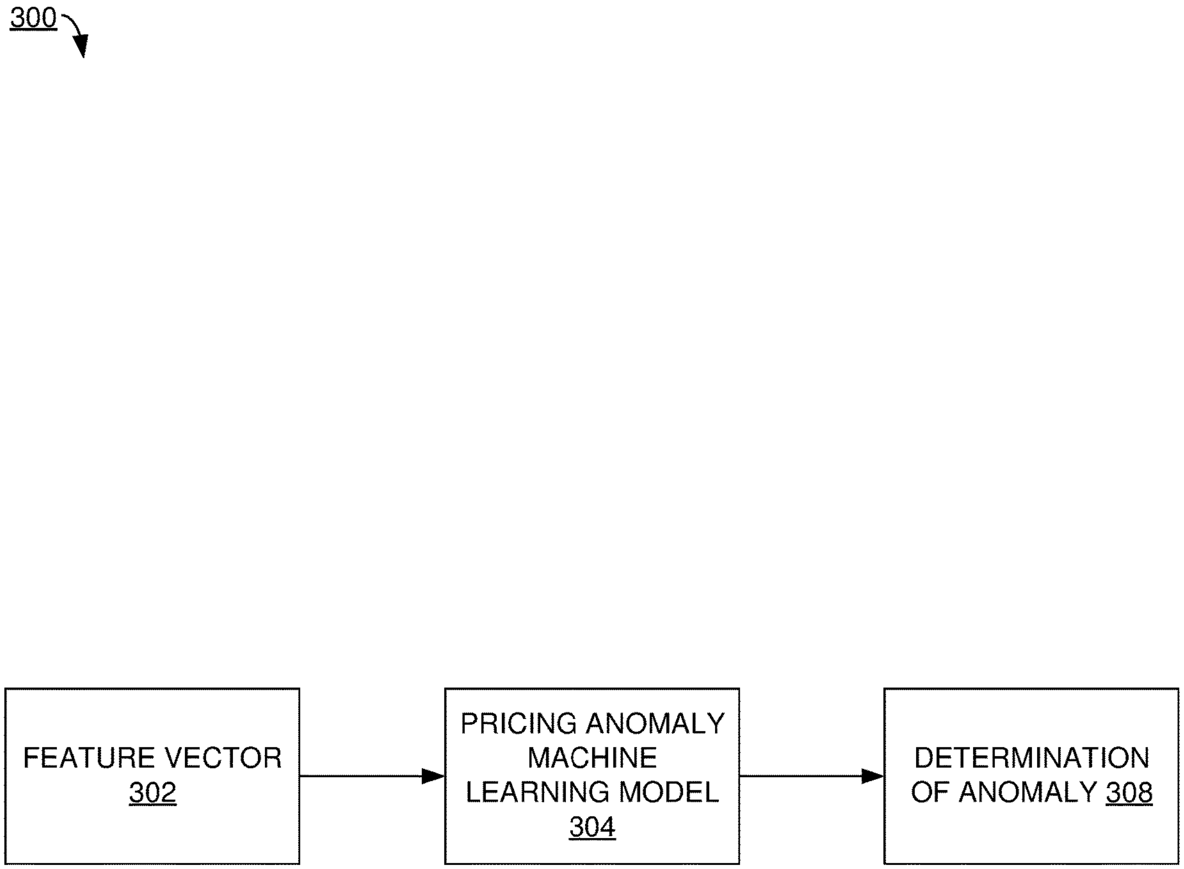
FIG. 3 illustrates another example system architecture that can facilitate anomaly detection for services pricing, in accordance with an embodiment of this disclosure.

FIG. 3 illustrates another example system architecture 300 that can facilitate anomaly detection for services pricing, in accordance with an embodiment of this disclosure. In some examples, system architecture 300 can be utilized to implement anomaly detection for services pricing component 106 of FIG. 1. System architecture 300 comprises feature vector 302, pricing anomaly machine learning model 304, and determination of anomaly 306.

Feature vector 302 can be similar to feature vector 500 of FIG. 5, and can be provided as input to pricing anomaly machine learning model 304. Pricing anomaly machine learning model 304 can comprise a trained machine learning model that is part of anomaly detection for services pricing component 106.

Pricing anomaly machine learning model 304 can take as input a feature vector for a service, and produce an output that indicates whether that service has an anomalous price. An output of pricing anomaly machine learning model 304 can be determination of anomaly 306.

In some examples, pricing anomaly machine learning model 304 can use isolation forest techniques to identify anomalies. Where an output of isolation forest techniques ranges on [0, 1], the determination in determination of anomaly 306 can be that an anomaly is identified where that output is less than or equal to 0.5, and can be that no anomaly is identified where that output is greater than 0.5.

FIG. 4 illustrates example extracted features 400 for a service that can facilitate anomaly detection for services pricing, in accordance with an embodiment of this disclosure. In some examples, features of extracted features can be extracted from information about services (such as that stored in pricing databases 104 of FIG. 1) by anomaly detection for services pricing component 106 of FIG. 1, and used to identify pricing anomalies.

Extracted features 400 comprises features table 402. In turn, features table 402 comprises row 404*a* and row 404*b*, each which identify extracted features about one service (and its corresponding hardware product). Features table 402 also comprises column 406, column 408, column 410, column 412, column 414, column 416, and column 418.

Column 406 is used to identify a particular SKU for the corresponding row. Column 408 indicates a chassis type for a product. Column 410 indicates a processor for the product. Column 412 indicates memory for the product. Column 414 indicates a redundant array of inexpensive disks (RAID) type for the product. Column 416 indicates a hard drive for the product. Column 418 indicates an internal optical drive for the product. These extracted features can be converted into respective numerical representations as part of feature vector 500 and used to identify pricing anomalies.

FIG. 5 illustrates a feature vector 500 that can facilitate anomaly detection for services pricing, in accordance with an embodiment of this disclosure. In some examples, features of feature vector 500 can be determined from extracted features 400 of FIG. 4 by anomaly detection for services pricing component 106 of FIG. 1, and used to identify pricing anomalies. Feature vector 500 can comprise a numerical representation of the features of extracted features 400 of FIG. 4 in row 404*a*.

Feature vector 500 comprises feature 502 (which can be a numerical representation of the corresponding value of column 406), feature 504 (which can be a numerical representation of the corresponding value of column 408), feature 506 (which can be a numerical representation of the corresponding value of column 410), feature 508 (which can be a numerical representation of the corresponding value of column 412), feature 510 (which can be a numerical representation of the corresponding value of column 414), feature 512 (which can be a numerical representation of the corresponding value of column 416), and feature 514 (which can be a numerical representation of the corresponding value of column 418).

Various techniques can be applied for turning the text of extracted features 400 of FIG. 4 feature 502 (which can be a numerical representation of the corresponding value of column 406), into the numerical values of feature vector 500.

Example Process Flows

FIG. 6 illustrates an example process flow 600 for analyzing a new service that can facilitate anomaly detection for services pricing, in accordance with an embodiment of this disclosure. In some examples, one or more embodiments of process flow 600 can be implemented by anomaly detection for services pricing component 106 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 700 of FIG. 7, process flow 800 of FIG. 8, process flow 900 of FIG. 9, and/or process flow 1000 of FIG. 10.

Process flow 600 begins with 602, and moves to operation 604. Operation 604 depicts receiving information about a new service. In some examples, anomaly detection for services pricing component 106 of FIG. 1 can periodically check pricing databases 104 to determine whether a change has been made. In some examples, this change can comprise an addition of a new service to a database of pricing databases 104. In some examples, this change can comprise a pre-existing entry for a service in a database being updated with a new price.

In some examples, rather than anomaly detection for services pricing component 106 of FIG. 1 periodically checking pricing databases 104, a component can send new or updated pricing database information to anomaly detection for services pricing component 106 when that new or updated information is created or modified.

After operation 604, process flow 600 moves to operation 606.

Operation 606 depicts identifying similarities between the new service and existing services. In some approaches to identifying anomalies, a cold start problem can occur in attempting to analyze a price of a newly-added service because of a lack of historical information about the service from which to base anomaly detection.

In contrast, in process flow 600, a new service can be compared to other services, based on a similarity of features between the new service and of the other services. This comparison with other services can provide sufficient information to form a basis for which the new service has a pricing anomaly.

After operation 606, process flow 600 moves to operation 608.

Operation 608 depicts identifying whether an anomaly exists in pricing for the new service based on the similarities. In some examples, operation 608 can be implemented with anomaly detection for services pricing component 106 of FIG. 1 performing pricing anomaly analysis on the new service.

After operation 608, process flow 600 moves to 610, where process flow 600 ends.

FIG. 7 illustrates an example process flow 700 for performing iterations that can facilitate anomaly detection for services pricing, in accordance with an embodiment of this disclosure. In some examples, one or more embodiments of process flow 700 can be implemented by anomaly detection for services pricing component 106 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 600 of FIG. 6, process flow 800 of FIG. 8, process flow 900 of FIG. 9, and/or process flow 1000 of FIG. 10.

Process flow 700 begins with 702, and moves to operation 704. Operation 704 depicts performing model training or analysis of possible anomalies. Performing model training can comprise training a machine learning model that is utilized by anomaly detection for services pricing component 106 to detect anomalies in service pricing. Performing analysis of possible anomalies can comprise using a trained machine learning model to identify possible anomalies in service pricing.

After operation 704, process flow 700 moves to operation 706.

Operation 706 depicts determining whether a trigger for a new iteration has occurred. A trigger can be time-based, such as the expiration of a timer that measures a day or a week. In some examples, a trigger can be event-based, such as upon an event of a new service being introduced. In some examples, a combination of time-based and event based triggers can be implemented—e.g., the trigger occurs at the expiration of a known period of time since a training or analysis iteration has been performed, or upon the occurrence of an event, whichever comes first.

Where it is determined in operation 706 that a trigger for a new iteration has occurred, process flow 700 returns to operation 704. Instead, where it is determined in operation 706 that a trigger for a new iteration has occurred, process flow 700 remains at operation 706.

In this manner, iterations of both model training and pricing anomaly detection can be performed over time.

FIG. 8 illustrates an example process flow 800 for performing anomaly detection for services pricing, in accordance with an embodiment of this disclosure. In some examples, one or more embodiments of process flow 800 can be implemented by anomaly detection for services pricing component 106 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 600 of FIG. 6, process flow 700 of FIG. 7, process flow 900 of FIG. 9, and/or process flow 1000 of FIG. 10.

Process flow 800 begins with 802, and moves to operation 804. Operation 804 depicts identifying a group of computer services, the computer services of the group corresponding to respective computer hardware. This can comprise identifying services pricing information, such as that which is stored in pricing databases 104 of FIG. 1. After operation 804, process flow 800 moves to operation 806.

Operation 806 depicts extracting features that respectively identify characteristics of the computer services, a feature of the features comprising ratio information representative of a ratio of a first price of a computer service of the group of computer services to a second price of a corresponding computer hardware of the respective computer hardware that corresponds to the computer service. That is, features can be extracted from the pricing information, and one of those features can include a ratio of the service's price to a price of the hardware that the service corresponds to. These features can be similar to extracted features 400 of FIG. 4. After operation 806, process flow 800 moves to operation 808.

Operation 808 depicts converting the features into a numerical representation of the features. That is, the information about the features can be converted into a numerical feature vector, similar to feature vector 500 of FIG. 5. After operation 808, process flow 800 moves to operation 810.

Operation 810 depicts clustering the computer services into multiple clusters based on the numerical representation of the features. That is, the multiple computer services can be divided among multiple clusters, where each service is a member of one cluster. Clustering in this manner can reduce a number of services that are subsequently compared against each other. After operation 810, process flow 800 moves to operation 812.

Operation 812 depicts identifying, from a cluster of the multiple clusters and based on a machine learning model, an anomalous price for at least one computer service of the group of computer services that belongs to the cluster. In some examples, this can comprise applying isolation forest techniques to a cluster of the clusters to identify at least one service that has an anomalous price.

In some examples, the ratio information representative of the ratio is first ratio information representative of a first ratio, and operation 812 comprises, after the clustering of the computer services, extracting additional features for computer services of the cluster of the multiple clusters, an additional feature of the additional features comprising second ratio information representative of a second ratio of a first previous price of the computer service to a second previous price of the corresponding computer hardware, and identifying the anomalous price based on the second ratio. That is, an additional engineered feature can comprise a ratio of previous price-cost to cost.

In some examples, the ratio information representative of the ratio is first ratio information representative of a first ratio, and operation 812 comprises, after the clustering of the computer services, extracting additional features for computer services of the cluster of the multiple clusters, an additional feature of the additional features comprising second ratio information representative of a second ratio of an average price of one of the computer services of the cluster to the second price of the corresponding computer hardware, and identifying the anomalous price based on the second ratio. That is, an additional engineered feature can comprise an average of price-cost to cost for assigned clusters.

In some examples, the ratio is a first ratio, and operation 812 further comprises, after the clustering of the computer services, extracting additional features for clustered computer services of the cluster of the multiple clusters, an additional feature of the additional features comprising a standard deviation of respective second ratios of respective prices of the clustered computer services to the second price of the corresponding computer hardware, and identifying the anomalous price based on the standard deviation. That is, an additional engineered feature can comprise a standard deviation of price-cost to cost for assigned clusters.

After operation 812, process flow 800 moves to operation 814.

Operation 814 depicts storing an indication of the anomalous price. This can comprise computer system 102 of FIG. 1 storing information about the service and its anomalous price in a computer memory or disk.

In some examples, operation 814 comprises periodically iterating the clustering, the identifying of the anomalous price, and the storing. That is, a machine learning model can periodically be trained, and the model can periodically be applied to pricing information to identify anomalous prices. In some examples, the machine learning model can be re-trained after new pricing has been implemented. This can be done to prepare the machine learning model for a next update of pricing.

In some examples, the computer service is a first computer service, and operation 814 comprises after the storing of the first anomalous price, identifying a price change to a second computer service of the group of computer services, identifying, from the price change to the second computer service, a second anomalous price. That is, a service can have its priced change, which can lead to identifying an anomaly in a subsequent check for anomalies.

In some examples, the anomalous price is a first anomalous price, wherein the computer service is a first computer service, and operation 814 comprises, after the storing of the first anomalous price, identifying a second computer service that has been added to the group of computer services, and identifying, from the second computer service, a second anomalous price. That is, pricing for a new service can be added, which can lead to identifying an anomaly in a subsequent check for anomalies.

After operation 814, process flow 800 moves to 816, where process flow 800 ends.

FIG. 9 illustrates an example process flow 900 for performing anomaly detection for services pricing, in accordance with an embodiment of this disclosure. In some examples, one or more embodiments of process flow 900 can be implemented by anomaly detection for services pricing component 106 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 600 of FIG. 6, process flow 700 of FIG. 7, process flow 800 of FIG. 8, and/or process flow 1000 of FIG. 10.

Process flow 900 begins with 902, and moves to operation 904. Operation 904 depicts identifying computer services corresponding to respective computer hardware. In some examples, operation 904 can be implemented in a similar manner as operation 804 of FIG. 8. After operation 904, process flow 900 moves to operation 906.

Operation 906 depicts extracting features that identify characteristics of the computer services, a feature of the features comprising a ratio of a first price of a computer service of the computer services to a second price of a corresponding computer hardware of the respective computer hardware. In some examples, operation 906 can be implemented in a similar manner as operation 806 of FIG. 8.

In some examples, the feature is a first feature, and wherein a second feature of the features comprises a product specification of the corresponding computer hardware associated with the computer service. That is, a specification for a product can be used for features, and a type of a service can be used for features.

In some examples, the feature is a first feature, and a second feature of the features comprises a level of service enabled for the computer service, the level of service identifying a performance metric to be satisfied in delivery of the computer service. That is, information about a service level agreement of a service can be used for features.

After operation 906, process flow 900 moves to operation 908.

Operation 908 depicts clustering a group of the computer services into multiple clusters based on the features. In some examples, operation 908 can be implemented in a similar manner as operation 810 of FIG. 8.

In some examples, the clustering of the group of the computer services comprises clustering identified computer services of the computer services that share a corresponding computer hardware. That is, service SKUs can be clustered based on a respective product cluster that they are associated with.

In some examples, operation 908 comprises determining a number of clusters of the multiple clusters to use in the clustering based on a sum of squared distances determined for extracted features of respective computer services of the group of computer services to respective closest cluster centers, and a weighting factor that weights the determining of the number of clusters to prioritize a lower number of clusters over a higher number of clusters. That is, a number of clusters to use in the clustering can be determined based on an adjusted inertia metric.

In some examples, the clustering is based on a measure of similarity determined between a respective vector of extracted features of two computer services of the group of computer services, the measure of similarity being based on a cosine of an angle between the two respective vectors. That is, cosine similarity can be used for clustering.

In some examples, operation 908 comprises creating a vector of the features of the computer service before the clustering of the computer services.

After operation 908, process flow 900 moves to operation 910.

Operation 910 depicts identifying, from a cluster of the multiple clusters, an anomalous price for at least one of the group of computer services that belongs to the cluster. In some examples, operation 910 can be implemented in a similar manner as operation 812 of FIG. 8.

After operation 910, process flow 900 moves to 912, where process flow 900 ends.

FIG. 10 illustrates an example process flow 1000 for performing anomaly detection for services pricing, in accordance with an embodiment of this disclosure. In some examples, one or more embodiments of process flow 1000 can be implemented by anomaly detection for services pricing component 106 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 600 of FIG. 6, process flow 700 of FIG. 7, process flow 800 of FIG. 8, and/or process flow 900 of FIG. 9.

Process flow 1000 begins with 1002, and moves to operation 1004. Operation 1004 depicts extracting features that identify characteristics of each computer service of a group of computer services, each computer service corresponding to corresponding to computer hardware, a feature of the features comprising a ratio of a first price of a computer service of the group of computer services to a second price of a corresponding computer hardware of the computer hardware. In some examples, operation 1004 can be implemented in a similar manner as operation 806 of FIG. 8. After operation 1004, process flow 1000 moves to operation 1006.

Operation 1006 depicts clustering computer services of the group of computer services into multiple clusters based on the extracted features, resulting in clustered computer services. In some examples, operation 1006 can be implemented in a similar manner as operation 810 of FIG. 8. In some examples, the clustering is based on a k-means process. After operation 1006, process flow 1000 moves to operation 1008.

Operation 1008 depicts identifying, from a cluster of the multiple clusters, an anomalous price for at least one computer service of the clustered computer services that belongs to the cluster. In some examples, operation 1008 can be implemented in a similar manner as operation 812 of FIG. 8.

In some examples, the identifying of the anomalous price for the at least one computer service is performed based on a result of an analysis based on a machine learning model. That is, artificial intelligence/machine learning techniques can be implemented to identify anomalous prices.

In some examples, the machine learning model comprises a model generated based on an isolation forest process. That is, an isolation forest process can be used in identifying anomalous prices as part of machine learning techniques.

In some examples, an output of the isolation forest process is within a range of values, and wherein the anomalous price is identified based on the output being indicative of a value in a lower half of the range of values. For example, an output of an isolation forest process can range from [0, 1] and it can be determined that an anomaly exists where the output value is less than or equal to 0.5.

In some examples, identifying the anomalous price comprises comparing a prior exchange rate that was used to determine the first price of the computer service to a current exchange rate. That is, information about exchanged rates used to price services can be used as input, and a comparison between historical exchange rates and prevailing exchange rates can be used to identify an anomaly.

After operation 1008, process flow 1000 moves to 1010, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of computer system 102 of FIG. 1.

In some examples, computing environment 1100 can implement one or more embodiments of the process flows of FIGS. 6-10 to facilitate anomaly detection for services pricing.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:

identifying, by a system comprising at least one processor, computer services corresponding to respective computer hardware;

extracting, by the system, features that identify characteristics of the computer services, wherein the characteristics comprise a service type and a product specification;

converting the features into a numerical representation of the features to produce respective converted features;

creating respective numerical vectors that comprises the respective converted features and respective engineered features, wherein the respective engineered features comprise-a ratio of a first price of a computer service of the computer services to a second price of a corresponding computer hardware of the respective computer hardware;

clustering, by the system, the respective numerical vectors into multiple clusters based on the features, wherein the clustering comprises grouping together respective numerical vectors that correspond to services that satisfy respective similarity criterions such that respective numerical vectors assigned to the same group are more similar to other respective numerical vectors in that group than to numerical vectors in other groups, and wherein the clustering of the group of the computer services comprises clustering identified computer services of the computer services that share a configuration for a computer hardware type;

determining, by the system, that a computer service of a group of computer services that belongs to a cluster of the multiple clusters is new or has experienced a price change; and based on the determining, identifying, by the system and from the cluster of the multiple clusters, that the computer service that belongs to the cluster has an anomalous price, wherein the identifying is performed based on a trained machine learning model, wherein the trained machine learning model is iteratively trained on respective groups of numerical vectors via an unsupervised learning technique, wherein at least two groups of numerical vectors of the groups of numerical vectors differ from each other, wherein the machine learning model is configured to operate on a group of data by isolating anomalous data points via iteratively splitting the group of data until an anomalous data point of the anomalous data points becomes isolated from the group of data, wherein the machine learning model is configured to select at least one feature from the features to produce at least one selected feature, wherein the machine learning model is configured to split the group of data based on a minimum value and a maximum value of respective selected features of the at least one selected feature in the group of data, wherein the machine learning model is configured to output a numerical value that represents a degree of anomaly of the anomalous data point, wherein the anomalous price is determined based on a comparison between the numerical value and a threshold anomaly value, and wherein a trigger for performing an iteration of training of the machine learning model comprises the expiration of a timer or the determining that the computer service is new or has experienced the price change.

2. The method of claim 1, wherein the at least one feature is at least one first feature, and wherein a second feature of the features comprises a product specification of the corresponding computer hardware associated with the computer service.

3. The method of claim 1, wherein the at least one feature is at least one first feature, and wherein a second feature of the features comprises a level of service enabled for the computer service, the level of service identifying a performance metric to be satisfied in delivery of the computer service.

4. The method of claim 1, further comprising:

determining, by the system, a number of clusters of the multiple clusters to use in the clustering based on a sum of squared distances determined for extracted features of respective computer services of the group of computer services to respective closest cluster centers, and a weighting factor that weights the determining of the number of clusters to prioritize a lower number of clusters over a higher number of clusters.

5. The method of claim 1, wherein the clustering is based on a measure of similarity determined between a respective vector of extracted features of two computer services of the group of computer services, the measure of similarity being based on a cosine of an angle between the two respective vectors.

6. The method of claim 1, further comprising:

creating, by the system, a vector of the features of the computer service before the clustering of the computer services.

7. A non-transitory computer-readable medium comprising instructions that, in response to execution, cause a system comprising at least one processor to perform operations, comprising:

extracting features that identify characteristics of each computer service of a group of computer services, each computer service corresponding to corresponding to computer hardware, a feature of the features comprising a ratio of a first price of a computer service of the group of computer services to a second price of a corresponding computer hardware of the computer hardware;

creating numerical vectors based on the extracted features;

clustering computer services of the group of computer services into multiple clusters based on the numerical vectors, resulting in clustered computer services, wherein the clustering comprises grouping together respective numerical vectors that correspond to services that satisfy respective similarity criterions, and wherein the clustering comprises clustering identified computer services of the computer services that are configured for a computer hardware type;

determining that a computer service of a group of computer services that belongs to a cluster of the multiple clusters is new or has experienced a price change; and based on the determining, identifying, from the cluster of the multiple clusters, that the computer service of the clustered computer services that belongs to the cluster has an anomalous price, wherein the identifying is performed based on a trained machine learning model, wherein the trained machine learning model is iteratively trained on respective groups of numerical vectors, wherein at least two groups of numerical vectors of the groups of numerical vectors differ from each other, wherein the machine learning model is configured to be trained via unsupervised machine learning, wherein a type of the machine learning model comprises an isolation forest, wherein the trained machine learning model is configured to select a feature from the extracted features to produce a selected feature, wherein the trained machine learning model is configured to split the numerical values based on a minimum value and a maximum value of respective selected features of the selected feature in the respective groups of numerical vectors, wherein the trained machine learning model is configured to output a numerical value that represents a degree of anomaly of the computer service of the clustered computer services that belongs to the cluster has an anomalous price, wherein the anomalous price is determined based on a comparison between the numerical value and a threshold anomaly value, and wherein a trigger for performing an iteration of training of the machine learning model comprises the expiration of a timer or the determining that the computer service is new or has experienced the price change.

8. The non-transitory computer-readable medium of claim 7, wherein the clustering is based on a k-means process.

9. The non-transitory computer-readable medium of claim 7, wherein the identifying of the anomalous price for the at least one computer service is performed based on a result of an analysis based on a machine learning model.

10. The non-transitory computer-readable medium of claim 7, wherein the identifying of the anomalous price comprises:

comparing a prior exchange rate that was used to determine the first price of the computer service to a current exchange rate.

11. A system, comprising:

at least one processor; and at least one memory that stores executable instructions that, when executed by the at least one processor, facilitate performance of operations, comprising:

extracting features that identify characteristics of each computer service of a group of computer services, each computer service corresponding to corresponding to computer hardware, a feature of the features comprising a ratio of a first price of a computer service of the group of computer services to a second price of a corresponding computer hardware of the computer hardware;

creating numerical vectors based on the extracted features;

clustering computer services of the group of computer services into multiple clusters based on the numerical vectors, resulting in clustered computer services, wherein the clustering comprises grouping together respective numerical vectors that correspond to services that satisfy respective similarity criterions, and wherein the clustering of the group of the computer services comprises clustering identified computer services of the computer services that share being configured for a computer hardware type;

determining that a computer service of a group of computer services that belongs to a cluster of the multiple clusters is new or has experienced a price change; and based on the determining, identifying, from the cluster of the multiple clusters, that the computer service of the clustered computer services that belongs to the cluster has an anomalous price, wherein the identifying is performed based on a trained machine learning model, wherein the trained machine learning model is iteratively trained on respective groups of numerical vectors via an unsupervised learning technique, wherein a type of the trained machine learning model comprises an isolation forest, wherein a trigger for performing an iteration of training of the trained machine learning model comprises the expiration of a timer or the determining that the computer service is new or has experienced the price change, wherein the trained machine learning model is configured to select at least one feature from the extracted features to produce at least one selected feature, wherein the trained machine learning model is configured to split the numerical values based on a minimum value and a maximum value of respective selected features of the at least one selected feature in the respective groups of numerical vectors, wherein the trained machine learning model is configured to output a numerical value that represents a degree of anomaly of the computer service of the clustered computer services that belongs to the cluster has an anomalous price, wherein the anomalous price is determined based on a comparison between the numerical value and a threshold anomaly value, and wherein at least two groups of numerical vectors of the groups of numerical vectors differ from each other.

12. The system of claim 11, wherein the operations further comprise:

periodically iterating the clustering, the identifying of the anomalous price, and the storing.

13. The system of claim 11, wherein the ratio information representative of the ratio is first ratio information representative of a first ratio, and wherein the operations further comprise:

after the clustering of the computer services, extracting additional features for computer services of the cluster of the multiple clusters, an additional feature of the additional features comprising second ratio information representative of a second ratio of a first previous price of the computer service to a second previous price of the corresponding computer hardware; and identifying the anomalous price based on the second ratio.

14. The system of claim 11, wherein the ratio information representative of the ratio is first ratio information representative of a first ratio, and wherein the operations further comprise:

after the clustering of the computer services, extracting additional features for computer services of the cluster of the multiple clusters, an additional feature of the additional features comprising second ratio information representative of a second ratio of an average price of one of the computer services of the cluster to the second price of the corresponding computer hardware; and identifying the anomalous price based on the second ratio.

15. The system of claim 11, wherein the ratio is a first ratio, and wherein the operations further comprise:

after the clustering of the computer services, extracting additional features for the clustered computer services, an additional feature of the additional features comprising a standard deviation of respective second ratios of respective prices of the clustered computer services to the second price of the corresponding computer hardware; and identifying the anomalous price based on the standard deviation.

16. The non-transitory computer-readable medium of claim 7, wherein the feature is a first feature, and wherein a second feature of the features comprises a product specification of the corresponding computer hardware associated with the computer service.

17. The non-transitory computer-readable medium of claim 7, wherein the feature is a first feature, and wherein a second feature of the features comprises a level of service enabled for the computer service, the level of service identifying a performance metric to be satisfied in delivery of the computer service.

18. The non-transitory computer-readable medium of claim 7, wherein the operations further comprise:

determining a number of clusters of the multiple clusters to use in the clustering based on a sum of squared distances determined for extracted features of respective computer services of the group of computer services to respective closest cluster centers, and a weighting factor that weights the determining of the number of clusters to prioritize a lower number of clusters over a higher number of clusters.

19. The system of claim 11, wherein the at least one feature is at least one first feature, and wherein a second feature of the features comprises a product specification of the corresponding computer hardware associated with the computer service.

20. The system of claim 11, wherein the at least one feature is at least one first feature, and wherein a second feature of the features comprises a level of service enabled for the computer service, the level of service identifying a performance metric to be satisfied in delivery of the computer service.

* * * * *